United States Patent [19]

Furuta et al.

[11] Patent Number: 4,732,451

[45] Date of Patent: Mar. 22, 1988

[54] STRUCTURE FOR MOUNTING AN OPTICAL ELEMENT

[75] Inventors: Hirosuke Furuta, Kawasaki; Kazushi Asanuma, Yokohama; Akira Okamoto, Higashikurume; Hideki Noda, Inagi, all of Japan

[73] Assignee: Fujitsu Limited, Kawasaki, Japan

[21] Appl. No.: 899,784

[22] Filed: Aug. 22, 1986

Related U.S. Application Data

[63] Continuation of Ser. No. 579,120, Feb. 10, 1984, abandoned.

[30] Foreign Application Priority Data

Feb. 17, 1983 [JP] Japan .................. 58-23821

[51] Int. Cl.4 .................. G02B 6/36; G02B 7/26
[52] U.S. Cl. .................. 350/96.20; 350/96.21
[58] Field of Search .............. 350/96.15, 96.16, 96.20, 350/96.21

[56] References Cited

U.S. PATENT DOCUMENTS

| 4,134,129 | 1/1979 | Filipovich | 358/155 |
| 4,237,474 | 12/1980 | Ladany | 350/96.20 |
| 4,436,083 | 3/1984 | Mori | 350/96.20 |
| 4,474,423 | 10/1984 | Bisbee et al. | 350/96.20 |
| 4,479,698 | 10/1984 | Landis et al. | 350/96.20 |
| 4,500,165 | 2/1985 | Scholl et al. | 350/96.20 |

FOREIGN PATENT DOCUMENTS 0051574 5/1982 European Pat. Off.
2054898 2/1981 United Kingdom.

OTHER PUBLICATIONS

European Search Report, Berlin, 11/20/86, Examiner: E. E. K. Kemsley

Primary Examiner—William L. Sikes
Assistant Examiner—Robert E. Wise
Attorney, Agent, or Firm—Staas & Halsey

[57] ABSTRACT

A structure for mounting on a base plate an optical element having a cylindrical portion. A holder member having a flat bottom surface is rotatably mounted on the cylindrical portion of the optical element. The holder member is mounted on and secured to a support member having an inclined upper surface so that the flat bottom surface of the holder member contacts the inclined upper surface of the support member in a face-to-face manner. The support member is secured to the base plate.

9 Claims, 9 Drawing Figures

STRUCTURE FOR MOUNTING AN OPTICAL ELEMENT

This is a continuation of copending application Ser. No. 579,120, filed on Feb. 10, 1984, now abandoned.

BACKGROUND OF THE INVENTION

1. Field of the Invention

The present invention relates to an optical device comprising optical elements, more particularly, to a structure for mounting optical elements on a base plate.

2. Description of the Prior Art

Optical communication systems make use of numerous optical devices, such as a device for coupling light, a device for multiplexing light components of different wavelenghts, a light source, and a device for attenuating light. Such optical devices include an optical element for emitting light and an optical element for receiving light, each optical element being mounted on a base plate and secured thereto. The usual optical element consists of a cylindrical sleeve housing a lens and one end of an optical transmission fiber.

Light from an optical transmission fiber of a first optical element for emitting light is transmitted to the optical transmission fiber of a second optical element for receiving light via a functional optical element, such as a filter, lens, prism, mirror, or switching element, disposed therebetween. Misalignment or inclination of the optical axis of the second optical element for receiving light (this axis coincides with the axis of the optical transmission fiber installed therein) with respect to the optical axis of the first optical element for emitting light results in increased transmission loss in the optical device. This is especially true when a single-mode type optical fiber is used, since the diameter of the core of the single-mode fiber is very small (about 10 $\mu$m) compared with the core of a multi-mode fiber (about 50 $\mu$m).

To minimize transmission loss in an optical device, the optical axis of the second optical element for receiving light must be precisely aligned with the optical axis of the first optical element for emitting light. The optical axis of the first optical element for emitting light is invariably slightly inclined with respect to the base plate surface since accuracy in producing the element and attaching it to the base plate is limited. Therefore, the optical axis of the second optical element for receiving light must be capable of slightly inclining with respect to the base plate surface to properly align it with the axis of the optical element for emitting light.

In a conventional optical device, an optical element for receiving light is mounted on and secured to the base plate as follows. First, the cylindrical sleeve of the optical element is disposed above the base plate at the position where the optical axis of the optical element for receiving light is aligned with the optical axis of the optical element for emitting light and held there temporarily by an appropriate temporary holder. Then, a support member is disposed between the cylindrical sleeve and the base plate. After that, the cylindrical sleeve is secured to the support member surface by means of a synthetic resin adhesive agent. The support member is also secured to the base plate by means of the adhesive agent. The temporary holder which held the cylindrical sleeve at that position is then removed.

In the conventional structure, the cylindrical sleeve contacts the support member surface only along a generating line of the cylindrical body. Therefore, the sleeve is easily displaced by the application of force thereto. Therefore, it is difficult to keep the sleeve reliably secured to the support member at the desired position. The problem is compounded in that the adhesive agent degrades when the ambient temperature or humidity changes. Also, the process for securing the sleeve to the support member requires a considerable amount of time due to the need to allow the adhesive agent to dry.

SUMMARY OF THE INVENTION

An object of the present invention is to provide a structure for mounting an optical element on a base plate which enables easy and reliable mounting at a desired position.

In accordance with the present invention, there is provided a structure for mounting an optical element having a cylindrical portion on a base plate. A holder member having a flat bottom surface is rotatably mounted on the cylindrical portion of said optical element. The holder member is mounted on and secured to a support member having an inclined upper surface so that the flat bottom surface contacts the inclined upper surface of the support member in a face-to-face manner. The support member is secured to the base plate.

BRIEF DESCRIPTION OF THE DRAWINGS

The above and other objects of the invention will be made more apparent in the ensuing description of preferred embodiments with reference to the drawings, wherein.

DESCRIPTION OF THE PREFERRED EMBODIMENTS

Figure 1:
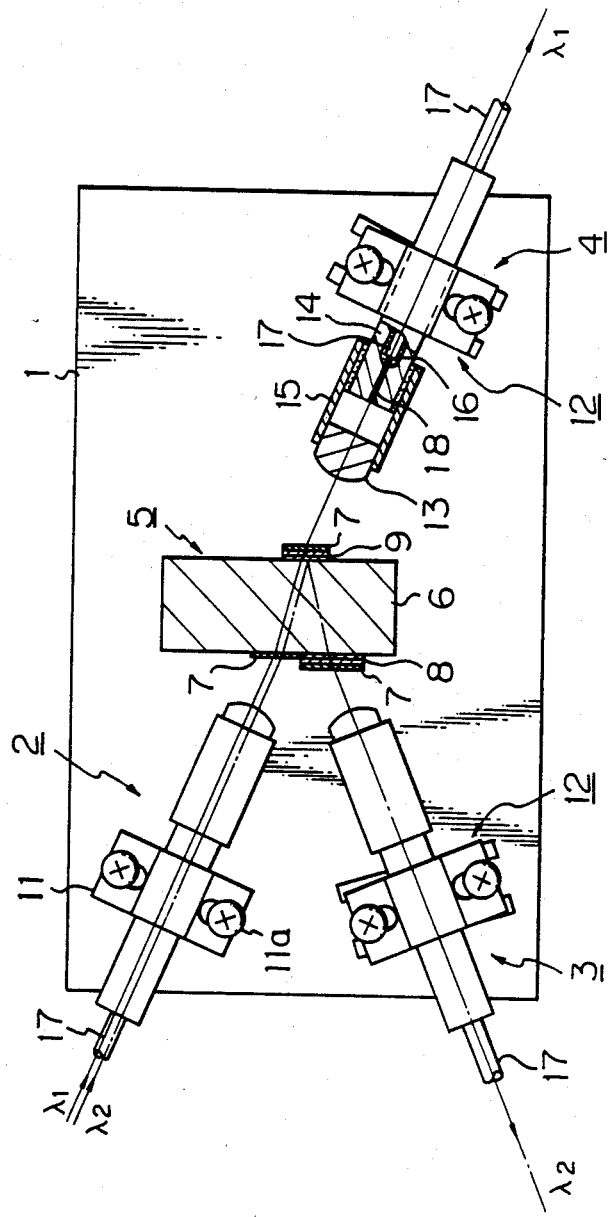
FIG. 1 is a plan view of an optical device in which the present invention is employed.

FIG. 1 is a plan view of a device for multiplexing light components of different wavelengths in which optical elements are secured to a base plate in a manner in accordance with the present invention. An input optical element 2, output optical elements 3 and 4, and a filtering element 5 are mounted on a base plate 1. The filtering element 5 comprises a prism 6, an anti-reflection film 7 on the prism 6 in the path of input light, a multi-layered filtering film 8 which allows passage of light of a wavelength of $\lambda_2$ and reflects light of a wavelength of other than $\lambda_2$ and another multi-layered filtering film 9 which allows passage of light of a wavelength of $\lambda_1$ and reflects light of a wavelength of other than $\lambda_1$.

The filtering films 8 and 9 are coated on the prism surface on the paths of output light toward the output elements 3 and 4, respectively. An anti-reflection film 7 is coated on each of the filtering films 8 and 9.

The input light emitted from the input optical element 2 includes a light component of wavelength of $\lambda_1$ and a light component of wavelength of $\lambda_2$. The light of wavelength of $\lambda_1$ is transmitted to the output optical element 4 through the filtering element 5 as illustrated by the solid line. The light of wavelength of $\lambda_2$ is transmitted to the other optical element 3 through the filtering element 5 as illustrated by the dash-dot line. Each of the optical elements 2, 3 and 4 comprises a lens 13, a ferrule 14 disposed at the end of a transmission optical fiber 17, and a cylindrical sleeve 15 in which the lens 13 and the ferrule 14 are secured by an adhesive agent. The ferrule 14 is of a cylindrical shape and has a longitudinal hollow in which the end of the optical fiber 17 is inserted and secured by an adhesive agent. The fiber core 18 of the optical fiber 17 is led to and exposed on the end surface of ferrule 14. This input optical element 2 is held by a holder 11 and secured to the base plate 1 by means of screws 11a. The output optical elements 3 and 4 are secured to the base plate 1 by a securing means 12 in accordance with the present invention.

Figure 2:
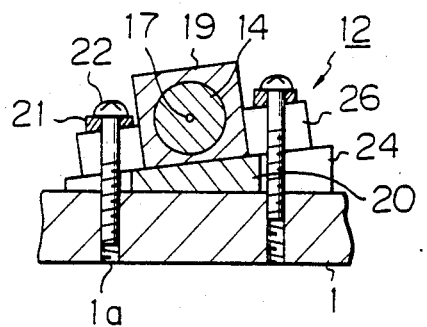
FIG. 2 is a partial sectional view of the optical device of FIG. 1.
Figure 3:
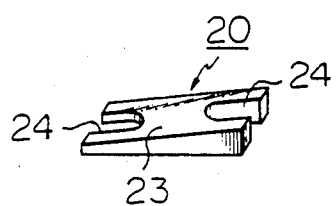
FIG. 3 is a perspective view of a support member used in the optical device of FIG. 1.
Figure 4:
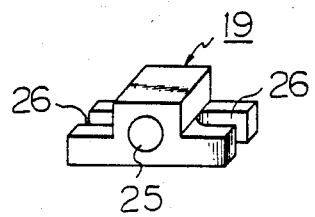
FIG. 4 is a perspective view of a holder member used in the optical device of FIG. 1.

The securing means 12 comprises a cylindrical holder member 19, a support member 20, and screws 22, as illustrated in FIG. 2. Numeral 21 designates a washer. The holder member 19 has a cylindrical hole 25 through which the ferrule 14 is inserted and openings 26 for guiding the screw 22 at both sides thereof, as illustrated in FIG. 4. The ferrule 14 is rotatably installed within the hole 25 of the holder 19. The support member 20 has an upper inclined surface 23 and openings 24 at both sides thereof, as illustrated in FIG. 3. The bottom surface of the holder member 19 is flattened so that holder member 19 can slide on the inclined surface 23 of the support member 20 before it is clamped by the screws 22.

The optical element is secured to the base plate by the securing means 12 as follows. First, the input optical element 2 is secured to the base plate 1 by means of the screws 11a. The holder member 19 is rotatably attached on the cylindrical ferrule 14 of the output optical element 4. A device for monitoring the luminous intensity is connected to the optical fiber 17 of the optical element 4. Using the monitor device, a position is found where the maximum luminous intensity is obtained, i.e., where the optical axis of the output element 4 coincides with the optical axis of the input optical element 2.

The optical element 4 is temporarily held at this position by an appropriate temporary holder which grasps the ferrule 14 of the optical element 4. Then, the support member 20 is inserted under the holder member 19 and slidingly moved on the base plate 1 until the inclined surface thereof completely contacts the bottom surface of the holder member 19. During this sliding movement of support member 20, the holder member 19 is rotated about the cylindrical ferrule 14, which is held stationary, in response to the movement of the support member 20.

When the upper inclined surface of the support member 20 coincides with the bottom surface of the holder member 19, the movement of the support member 20 is stopped. Then, each of the screws 22 is screwed into the screw holes 1a of the base plate 1 through the openings 26 of the holder member 19 and the openings 24 of the support member 20. The openings 24 of the support member 20 and the inclined angle of the upper surface of the support member 20 are designed to permit a wide range of positions of the support member 20. When the upper inclined surface 23 of the support member 20 is in complete contact with the bottom surface of the holder member 19, the openings 24 of the support member 20 must always expose the screw hole 1a of base plate 1.

After the optical element 4 is secured to the base plate 1 by the screws 22, the temporary holder, which has grasped the ferrule 14 at the position aligned with the optical axis of the input optical element 2, is removed. Then, the other output optical element 3 is similarly secured to the base plate 1.

The holder member 19 and the support member 20 may be secured to each other and to the base plate 1 by electric welding or laser welding instead of by using screws 22. Securing the holder member 19 and the support member 20 by welding eliminates limitation in the range of movement of the support member 20 since it is not necessary to consider screw holes in the base plate 1.

Many other variations of the structure of the optical device are possible. The input optical element may comprise a light emitting diode. In this case, the optical transmission fiber is replaced by an electric cable. Also, the output optical element may comprise a light receiving diode. A light attenuating element or a switching element may be disposed between the input optical element and the output optical element, instead of the filtering element of FIG. 1. Also, the optical device of FIG. 1 can be used as a device for combining light components of different wavelengths by reversing the direction of the light.

Figure 5:
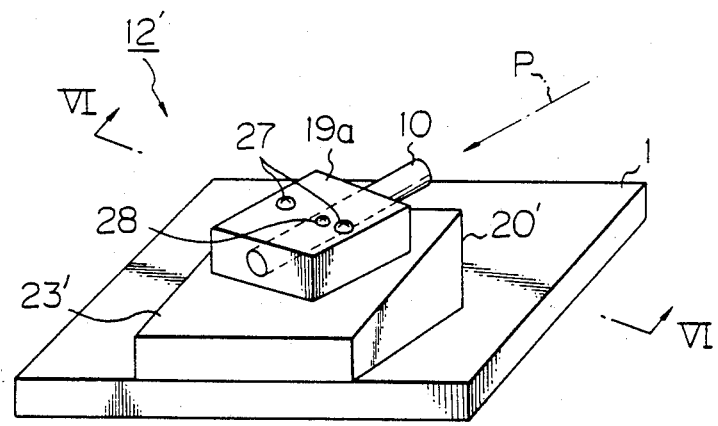
FIG. 5 is a perspective view of a structure for mounting an optical element in accordance with the present invention.
Figure 6:
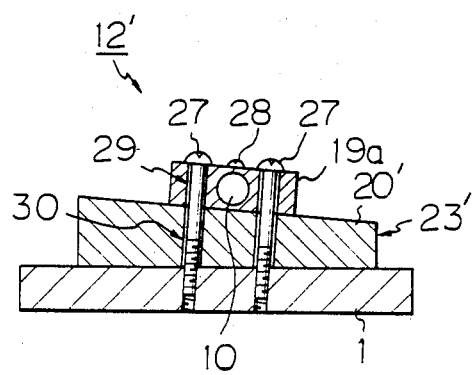
FIG. 6 is a sectional view along the line VI—VI in FIG. 5.
Figure 7:
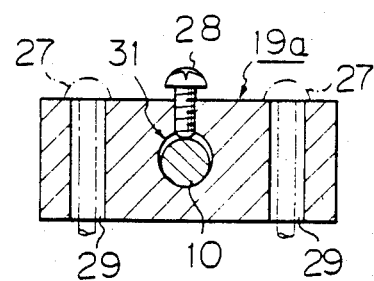
FIG. 7 is a sectional view of the holder member used in the structure of FIG. 5.

FIG. 5 is a perspective view of another embodiment of the present invention. FIG. 6 is a sectional view thereof. In the embodiment of FIGS. 5 and 6 each screw 27 for securing a holder member 19a and a support member 20' is screwed to the base plate 1 through a hole 29 of the holder member 19a and a hole 30 of the support member 20'. The inside diameter of the holes 29 and 30 is larger than the outside diameter of the screws 27, allowing the support member 20' to move because of the gap between the hole 30 and the screws 27. The cylindrical optical element 10 is clamped within the hole 31 of the holder member 19a by means of a screw 28, as illustrated in FIG. 7.

Figure 8:
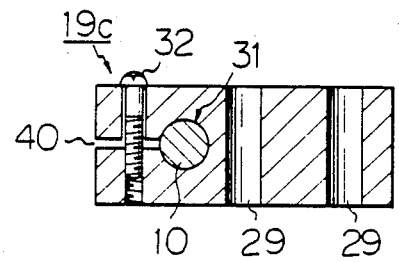
FIG. 8 is a sectional view of another example of the holder member in accordance with the present invention.
Figure 9:
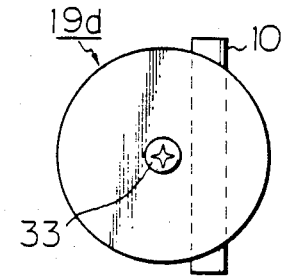
FIG. 9 is a plan view of yet another example of the holder member in accordance with the present invention.

Variations of the holder member are illustrated in FIGS. 8 and 9. In the holder member 19c of FIG. 8, the optical element 10 is held in the inner end 31 of a slit 40 formed at one side of the holder member 19c and fastened by a screw 32.

The holder member 19d of FIG. 9 has a cylindrical shape and is secured to the base plate by a single screw 33 disposed along the axis of the cylindrical body. The optical element 10 penetrates the cylindrical body at portion adjacent to the screw 33. In the embodiment of FIG. 10, the rotational movement of the holder member and the support member (not shown) which is disposed under the holder member is not limited since only one screw 33 is disposed at the center of the holder member and the support member. Therefore, the holder member and the support member are rotatable about the screw 33.

As mentioned above, in accordance with the mounting structure of the present invention, the optical element is held by a holder member whose bottom surface contacts the inclined upper surface of a support member in a face-to-face manner. Therefore, the optical element is secure more firmly and more reliably at the desired position when compared with the conventional structure in which the cylindrical optical element is supported along one line on the supporting surface.

Also, in the mounting structure of the present invention, no adhesive agent is used for securing the holder member and the support member to the base plate. This results in durable and reliable mounting of the optical element on the base plate irrespective of vibration of the optical device and changes in ambient temperature and humidity.

We claim:

1. A structure for mounting on a base plate an optical element having a cylindrical portion and an optical axis, comprising:
   a holder member, having a flat bottom surface and an opening, formed by a cylindrical inner surface, through which the cylindrical portion of the optical element penetrates, said holder member rotatably holding the cylindrical portion of the optical element; and
   a support member, adjustably securable to said holder member, having an inclined upper surface and a bottom surface, the flat bottom surface of said holder member contacting the inclined upper surface of said support member in a face-to-face manner, said support member capable of being secured to the base plate, the optical element being mounted on the base plate at an optimum position by aligning the optical axis of the optical element in a predetermined direction while adjusting the position of said support member under said freely rotatable holder member until the inclined upper surface of said support member is in face-to-face contact with the flat bottom surface of said holder member and the bottom surface of said support member is in face-to-face contact with the base plate, and then securing said support member to said holder member and the base plate, substantially all of the cylindrical inner surface of said holder member remaining in contact with the cylindrical portion of the optical element while adjusting the position of said support member.

2. A structure as set forth in claim 1, wherein said holder member and said support member are secured to each other and said support member is securable to the base plate by screws.

3. A structure as set forth in claim 2, wherein each of said holder member and said support member has openings with inner walls for guiding the screws, the openings having a size which leaves a gap between each of the screws and the inner wall of each of the openings, permitting said support member to be adjusted before being secured by the screws in a position where the flat bottom surface of said holder member contacts the inclined upper surface of said support member in the face-to-face manner.

4. A structure as set forth in claim 3, wherein the openings are cylindrical.

5. A structure as set forth in claim 3, wherein the openings are U-shaped.

6. A structure as set forth in claim 1, wherein said holder member and said support member are secured to each other and said support member is securable to the base plate by a weld.

7. A structure as set forth in claim 1, wherein the cylindrical portion can be clamped within the cylindrical hole by screws.

8. A structure as set forth in claim 1, wherein said holder member has one side having a slit with an inner end connected to the cylindrical hole through which the cylindrical portion of the optical element penetrates.

9. A structure as set forth in claim 1, wherein said holder member has a cylindrical shape with a single screw hole disposed along the axis of the cylindrical shape, said holder member and said support member being securable to the base plate by a screw passing through the single screw hole.

* * * * *